(12) United States Patent
Spriggel

(10) Patent No.: US 9,224,372 B1
(45) Date of Patent: Dec. 29, 2015

(54) CYMBAL MOUNTING ASSEMBLY

(71) Applicant: Daniel John Spriggel, Bermuda Dunes, CA (US)

(72) Inventor: Daniel John Spriggel, Bermuda Dunes, CA (US)

( * ) Notice: Subject to any disclaimer, the term of this patent is extended or adjusted under 35 U.S.C. 154(b) by 0 days.

(21) Appl. No.: 14/545,525

(22) Filed: May 18, 2015

(51) Int. Cl.
  *G10D 13/02* (2006.01)
  *G10D 13/06* (2006.01)
(52) U.S. Cl.
  CPC ..................... *G10D 13/06* (2013.01)
(58) Field of Classification Search
  CPC .................................................. G10D 13/06
  USPC ......................................................... 84/422
  See application file for complete search history.

(56) References Cited

U.S. PATENT DOCUMENTS

| 2004/0144234 A1* | 7/2004 | Liao .............................. 84/422.3 |
| 2010/0294111 A1* | 11/2010 | Carraro .................. G10D 13/06 84/421 |

* cited by examiner

*Primary Examiner* — Jianchun Qin
(74) *Attorney, Agent, or Firm* — Jack C. Munro

(57) ABSTRACT

A cymbal mounting assembly that has housing with a constant diameter through hole. A mounting rod of a music stand is to be conducted through the through hole with therebeing a loose fit between the mounting rod and the housing. A cymbal is loosely mounted on the housing so it can freely pivot or rock. The assembly includes a tightening nut with a friction feature included to adjust the amount of clamping force being applied to the cymbal. This friction feature prevents unauthorized adjusting of the rocking or pivoting motion (action) of the cymbal and this preselected amount of action by the drummer is maintained between playing locations and is only changed when the drummer decides to do so.

3 Claims, 4 Drawing Sheets

CYMBAL MOUNTING ASSEMBLY

BACKGROUND OF THE INVENTION

A cymbal is a metallic disc that has a center hole for mounting. The cymbal is mounted on a mounting rod of a musician stand. The cymbal is to be struck by a drummer with a drumstick creating a sharp sound that is desired when playing of music. The cymbal can be tightly mounted on the mounting rod of the musician's which will produce a muted sound or loosely mounted which will produce a freely vibrating sound. Actually the loose mounting can be adjusted to produce various different sounds.

The cymbal clamp assembly of the prior art required it to be assembled and installed I conjunction with the cymbal and the mounting rod. Disassembly is frequent as musicians commonly move between performing locations. The parts of the cymbal clamp assembly are separated and can be misplaced or lost when traveling between locations. This frequently results in the cymbal becoming inoperable. The prior art cymbal clamp assemblies are separate from the cymbal which encourages this misplacement or losing of the parts. There are up to five different parts of the prior art clamping arrangement which further encourages this misplacement or losing. The drummer also handles the cymbal which contaminates the surface of the cymbal with oil from the drummers hands. Accumulation of this oil will slightly change the sound produced by the cymbal which is not desirable. Also, some prior art cymbal clamp assemblies utilize a threaded tube and a threaded hole which is perpendicular to bite into the mounting rod. This biting deteriorates the mounting rod requiring premature replacement.

Each time a cymbal is to be played it has to be adjusted to determine the amount of rocking or pivoting motion of the cymbal. It would be desirable to not have to set the amount of rocking motion at each performance.

SUMMARY OF THE INVENTION

A cymbal mounting which is not clamped to the mounting rod of the musician stand. The cymbal mounting assembly of this invention has a housing through which is located a longitudinal center through hole. A mounting rod of a musician's stand is to be passed through this through hole. The through hole is oversized relative to the diameter of the mounting rod and is constant in diameter. The upper end of the assembly is formed into a knob which facilitates manual grasping by the drummer, installing and removing of the cymbal on the mounting rod eliminating the need for the drummer to ever touch the cymbal.

This knob can also permit the drummer to support the cymbal free of the mounting stand and strike the cymbal using the drummer's other hand. The cymbal is clamped between a pair of soft discs mounted on the assembly. The amount of rocking or pivoting motion (action) can be preselected by the drummer and once set will remain at the selected level since the assembly is permanently mounted on the cymbal. The assembly remains with the cymbal when in storage between playing times. The assembly can be used when stacking a plurality of cymbals and removed from the storage location in the stacked position not requiring such to be built on stage. The stacking of a plurality of cymbals together may be of different diameters and is usually just two cymbals.

DETAILED DESCRIPTION OF THE INVENTION

Figure 1:
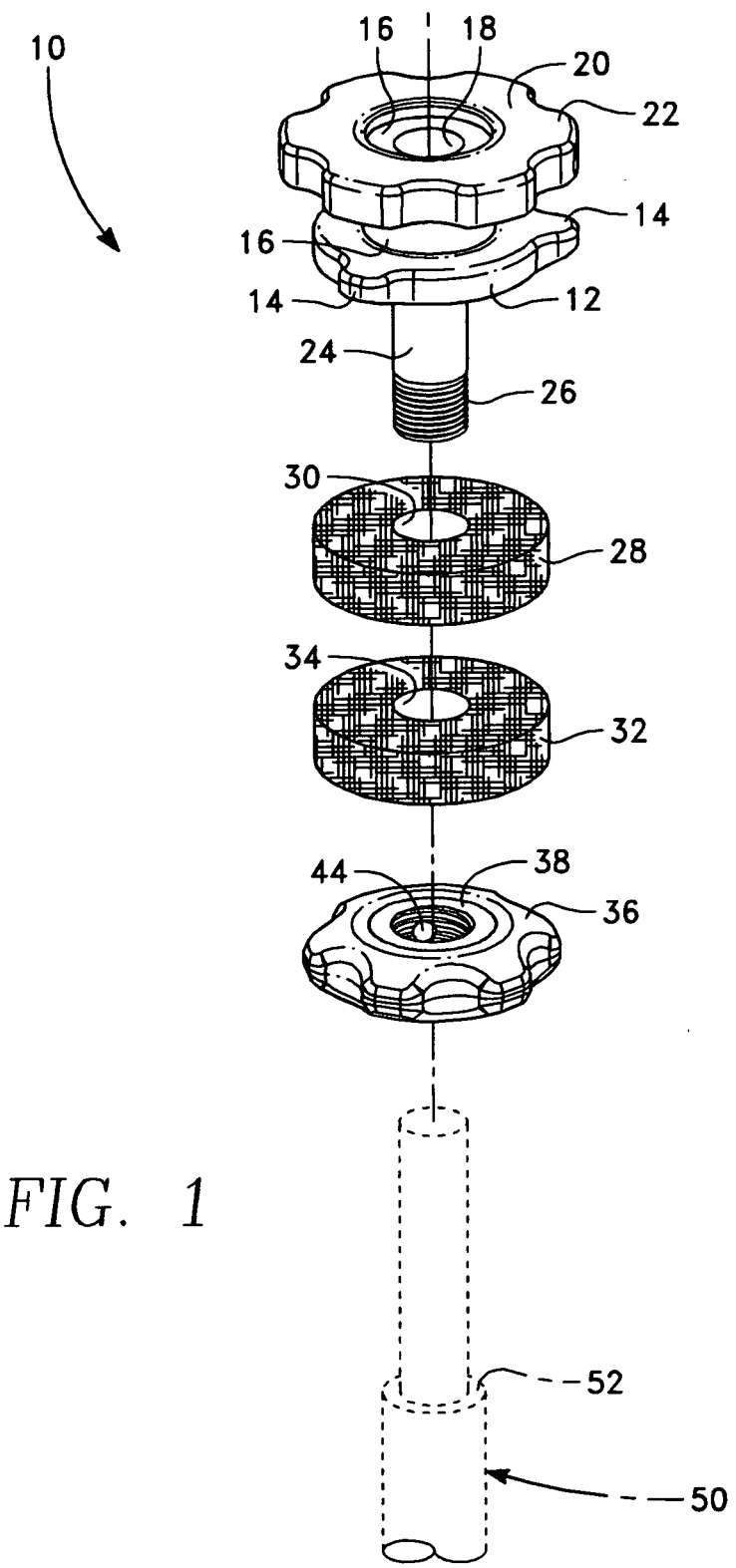
FIG. 1 is an exploded isometric view of the cymbal mounting assembly of this invention.
Figure 2:
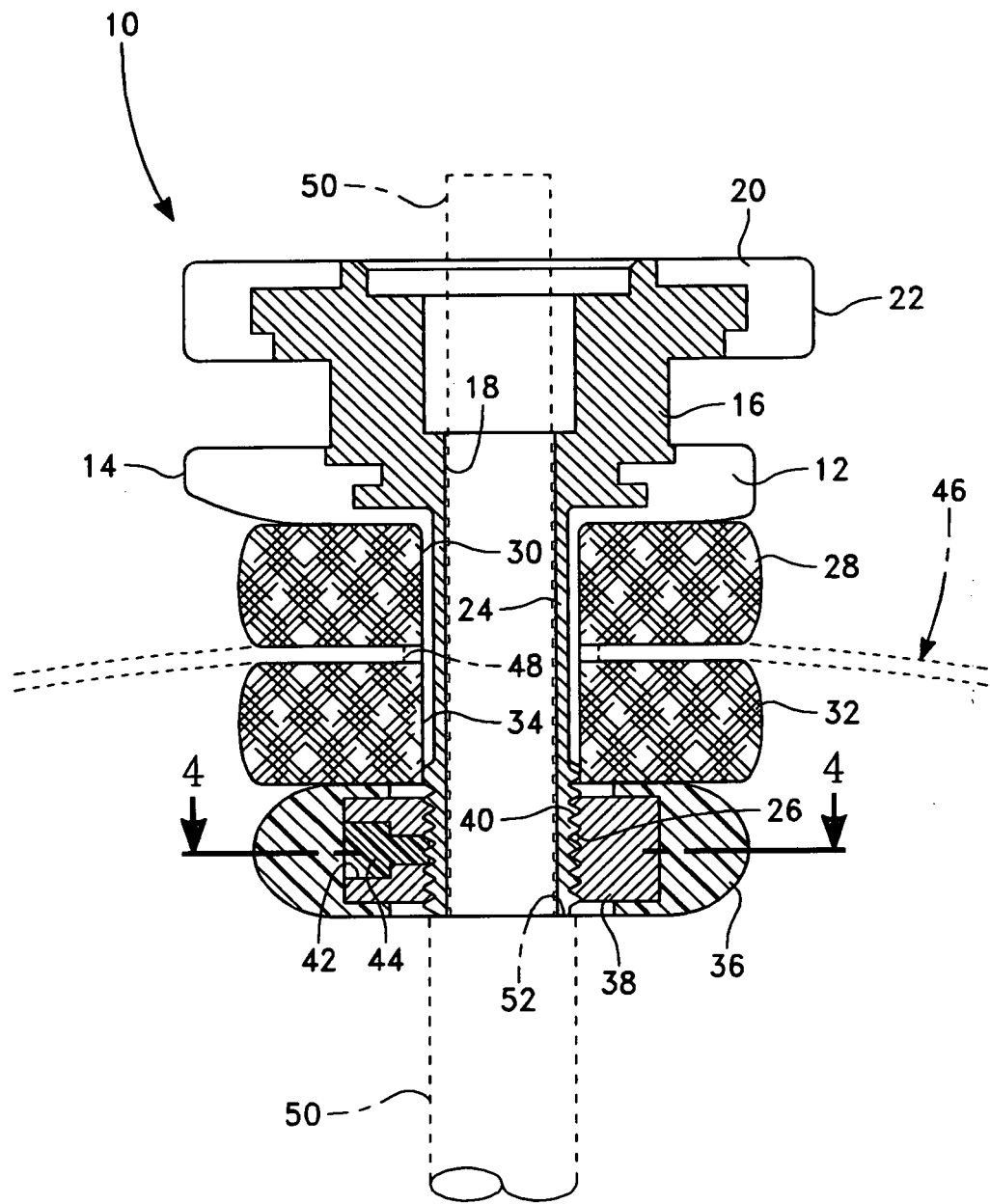
FIG. 2 is a longitudinal cross sectional view of the cymbal mounting assembly of this invention.

Referring specifically to FIGS. 1 and 2 of the drawings there is shown the cymbal mounting assembly 10 of this invention. Ring 12 is constructed of plastic and has a plurality of equiangularly spaced apart protrusions 14. There are three in number of protrusions 14. Protrusions 14 facilitate manual grasping of the ring 12 by the drummer. The ring 12 is tightly mounted on a metal insert 16. Metal insert 16 has a central through hole 18. Fixedly secured to the upper end of the metal insert 16 is a knob 20. The annular periphery of the knob 20 includes a series of protrusions 22 which again are for the purpose of facilitating grasping by the drummer.

Figure 3:
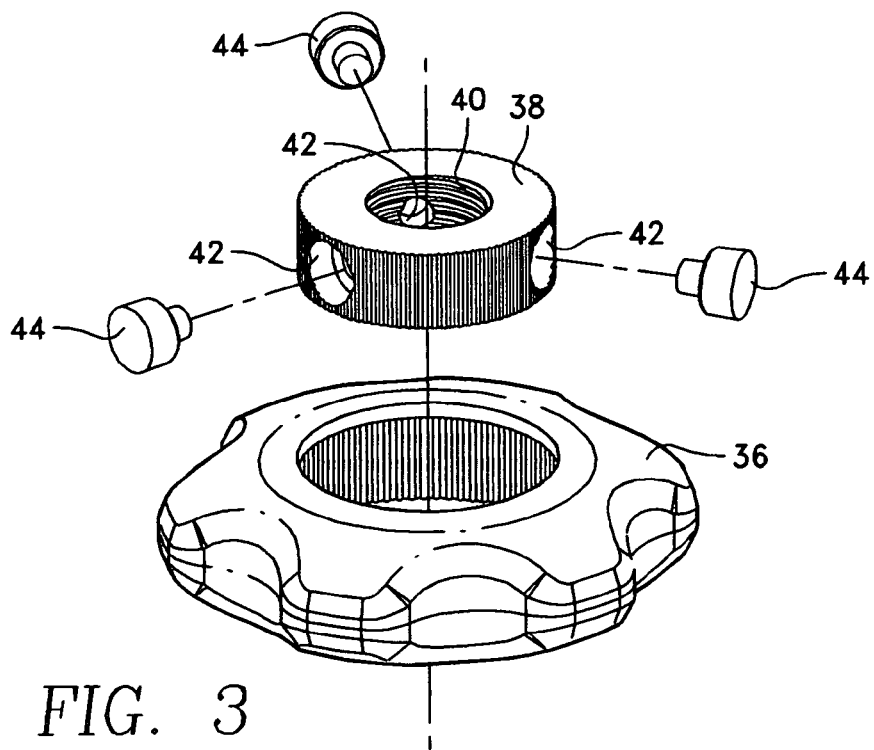
FIG. 3 is a disassembled isometric view of the tightening nut utilized in the cymbal mounting apparatus of this invention.
Figure 4:
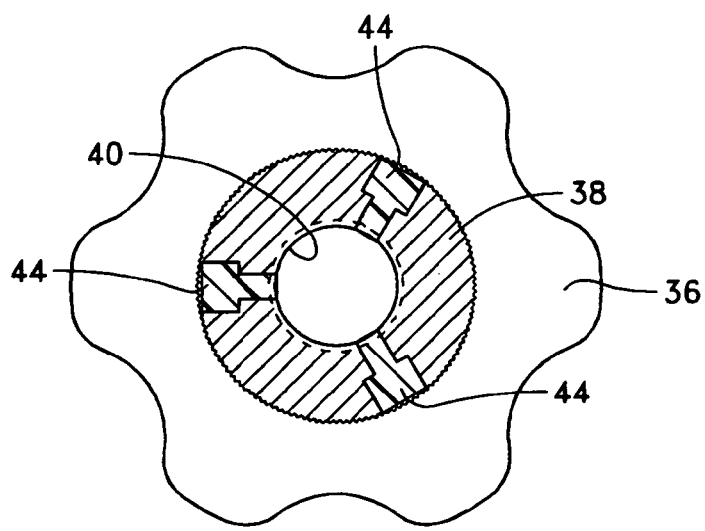
FIG. 4 is a top plan view of the tightening nut of FIG. 3.

Attached to the bottom surface of the metal insert 16 and is integral therewith is a tube 24. Tube 24 has at its lower end a series of external screw threads 26. Located about the tube 26 is an upper soft disc 28, usually constructed of felt, which also has a center hole 30. Tube 24 extends through center hole 30. A lower soft disc 32, which is also of felt and generally is identical to disc 28, is also located about tube 24 which extends through center hole 34 formed in disc 32. Referring particularly to FIGS. 3 and 4, a tightening nut has a plastic exterior which is molded tightly onto center ring 38. Center ring 38 is constructed of metal. Center ring 38 has a through hole 40 which is internally threaded. Center ring 38 has a plurality (3 in number of equiangularly spaced apart) holes 42. Mounted within each hole 42 is a nylon insert 44. When tightening nut 36 is threadably mounted onto screw threads 26, the nylon inserts 44 are pressed against the threads 26 producing a frictional force which must be overcome when unattaching tightening nut 36 from the tube 24. The outer end of each nylon insert 44 tightly abuts against the tightening nut 36.

Initially the tightening nut 36 is separated from tube 24 as well as the lower soft disc 32. A cymbal 46 connects with cymbal mounting assembly by the center hole 48 being located about tube 24 and against cymbal 46 being located against soft disc 28. Soft disc 32 is then installed with tube 24 being located within center hole 34. Soft disc 32 is now located against the underside of the cymbal 46. tightening nut 36 is then threaded onto threads 26. Tightening nut 36 could be located loosely which will permit the cymbal to rock or pivot freely producing a sharp sound when struck or the tightening nut could be turned tighter which presses soft discs 28 and 32 toward each other clamping tightly onto the cymbal 46 which will produce a muted sound when the cymbal 46 is struck. The drummer then places the cymbal mounting assembly on a mounting rod 50 of a music or cymbal stand not shown. The tightening nut 36 will rest on annular ledge 52 of the mounting rod 50. There is no attachment to the mounting rod 50 as the cymbal mounting assembly merely rests on the ledge 52.

Figure 5:
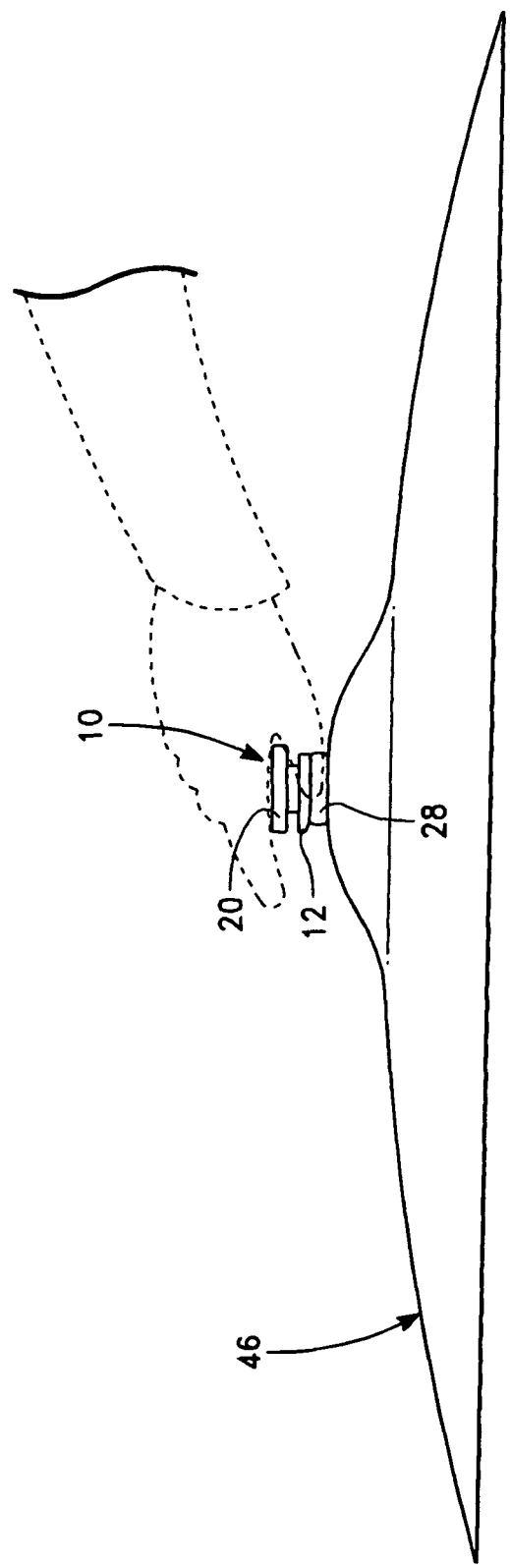
FIG. 5 is a side view depicting the installation of the cymbal mounting assembly in conjunction with a cymbal showing how a drummer could grasp the cymbal mounting assembly of this invention.

Another way the cymbal 46 could be played is for the drummer to pick up the ring 12 and knob 20 and separate the cymbal mounting assembly 10 from the mounting rod 50 as is shown in FIG. 5. With the drummer holding the cymbal 46 in a suspended position, the drummer can strike the cymbal 46 using his or her other hand.

The invention claimed is:

1. A cymbal mounting assembly to be placed on a mounting rod of a music stand comprising:

a housing having a longitudinally centrally located through hole, the mounting rod is to be located within said through hole, said through hole having a constant diameter, said through hole being oversized relative to the diameter of said mounting rod so said cymbal mounting assembly can be easily slid onto said mounting rod and easily slid off said mounting rod as there is no securement between said housing and said mounting rod, said housing having an enlarged upper end, a knob secured to said enlarged upper end, said knob having a centrally located through hole that aligns with said through hole of said housing;

a pair of soft discs mounted on said housing, a cymbal to be located between said discs;

a tightening nut threadably mounted on said housing and abutting one of said soft discs, turning of said nut causing movement of said nut toward a said disc applies a compressive force to said discs which secures in place the cymbal; and whereby said cymbal mounting assembly can be slipped on and off said mounting rod.

2. A cymbal mounting assembly to be placed on a mounting rod of a music stand comprising:

a housing having a longitudinally centrally located through hole, the mounting rod is to be located within said through hole, said through hole having a constant diameter, said housing having an enlarged upper end, a knob secured to said enlarged upper end, said knob having a centrally located through hole that aligns with said through hole of said housing;

a pair of soft discs mounted on said housing, a cymbal to be located between said discs;

a tightening nut threadably mounted on said housing and abutting one of said soft discs, turning of said nut causing movement of said nut toward a said disc applies a compressive force to said discs which secures in place the cymbal; and said tightening nut includes a nylon pin that presses against said housing to apply a frictional force preventing free turning of said tightening nut, turning of said nut is to occur only by application of a manual turning force overcoming said frictional force, upon release of the manual force from said tightening nut results in said tightening nut staying in its established position.

3. The cymbal mounting assembly as defined in claim 2 wherein:

therebeing a plurality of said nylon pins.

\* \* \* \* \*